Oct. 18, 1960 P. E. KLEINEBERG ET AL 2,956,295
INDEPENDENT DRIVING MECHANISM FOR BOOK
TRIMMER IN BOOKBINDING SYSTEM
Filed Aug. 15, 1957 5 Sheets-Sheet 1

INVENTORS
PAUL E. KLEINEBERG
HENRY R. MEBUS
BY
Kenyon & Kenyon
ATTORNEYS

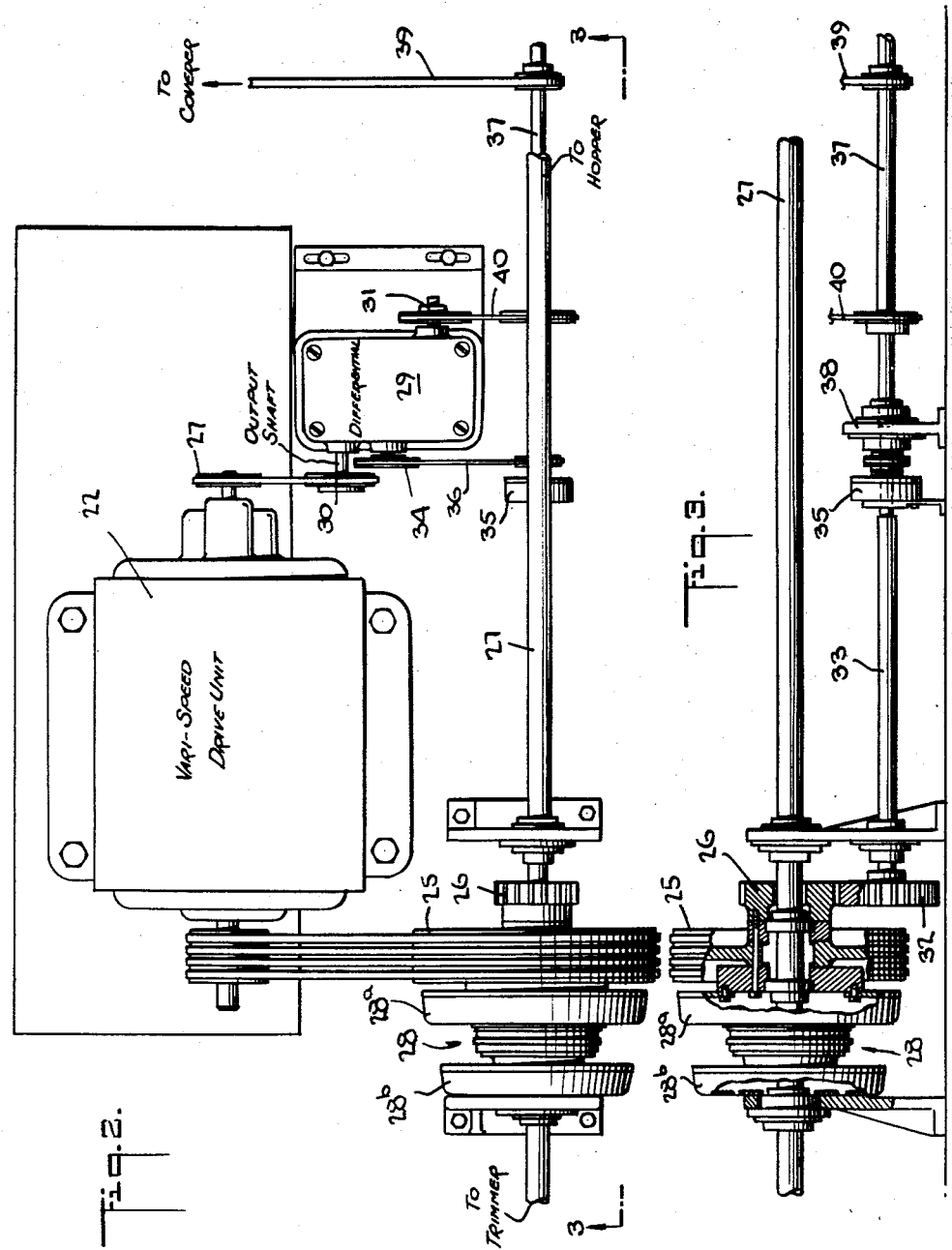

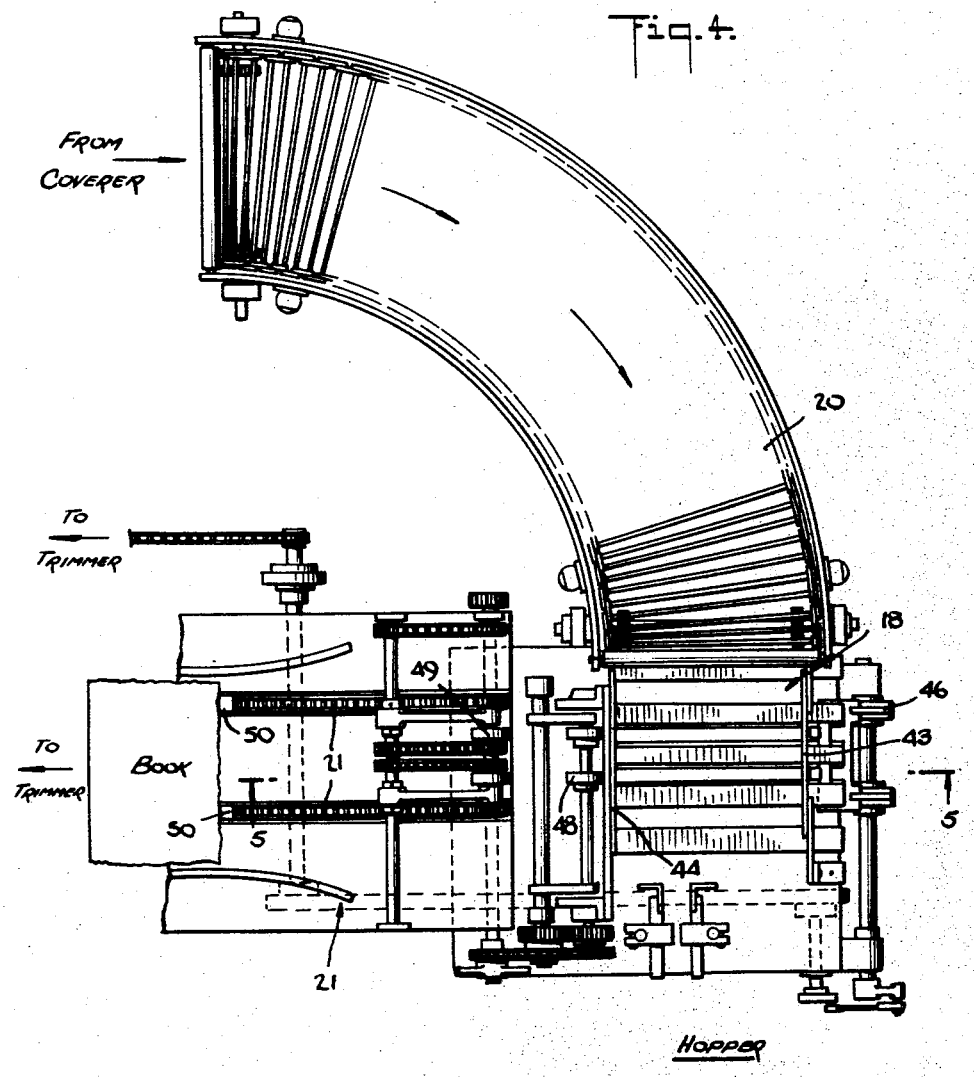

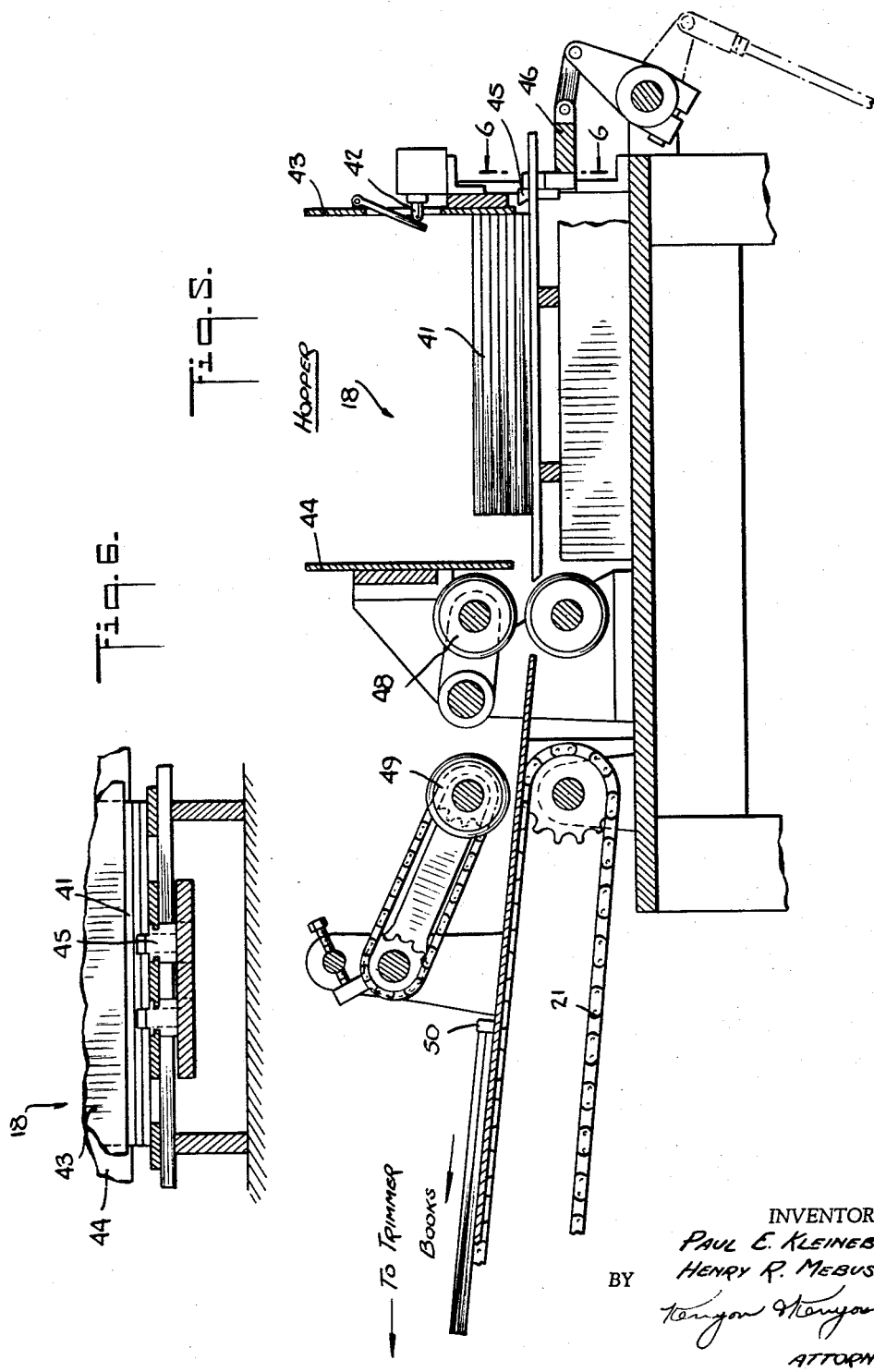

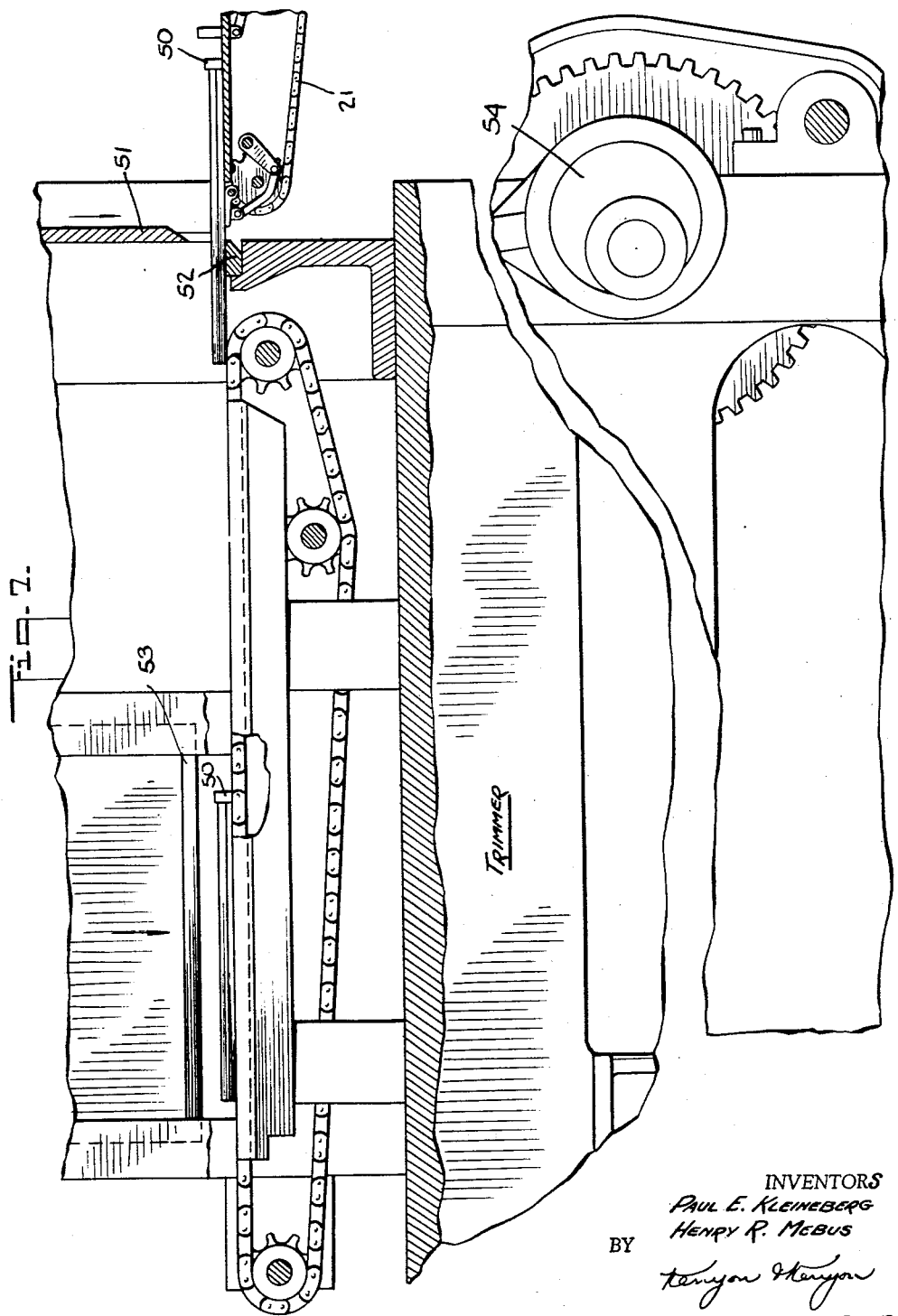

United States Patent Office 2,956,295
Patented Oct. 18, 1960

2,956,295

INDEPENDENT DRIVING MECHANISM FOR BOOK TRIMMER IN BOOKBINDING SYSTEM

Paul E. Kleineberg and Henry R. Mebus, Easton, Pa., assignors to T. W. & C. B. Sheridan Co., New York, N.Y., a corporation of New York Filed Aug. 15, 1957, Ser. No. 678,414

3 Claims. (Cl. 11—1)

The present invention relates generally to bookbinding machine systems wherein printed signatures are automatically gathered, stitched and covered and thereafter trimmed to form the finished product. More particularly, the invention pertains to an independent driving mechanism for the trimmer and apparatus coordinating the operation of this mechanism with the other components in the system.

In the manufacture of books, magazines, pamphlets and the like, the printed sheets or "signatures" are assembled in the order desired for binding. The gathering of signatures may be effected by inserting one within the other or by piling one on top of the other. The signatures so assembled in the gathering machine are then bound or stapled together in a stitching machine from which they are conveyed to a coverer. The coverer acts to spread paste on the back and to apply a cover jacket to the book. Finally the covered books are delivered through a hopper into an automatic trimmer device which serves to shear the edges of the books, the trimmer in most instances acting on two or more books at a time.

In present installations the automatic trimmer is operated from the same motor drive which powers the gatherer, stitcher and coverer assembly. Usually when adding an automatic trimmer to an existing gatherer, stitcher and coverer assembly, it is necessary to replace the motor in the assembly with a heavier duty motor and to link this motor to the trimmer drive shaft. Thus the heavy duty motor furnishes the common drive for all of the components of the system and thereby maintains all operations in proper synchronism. However, several serious drawbacks attend this arrangement.

The trimmer device includes reciprocating blades whose operation imposes an intermittent load on the drive system. This brings about a considerable degree of vibratory shock which by reason of the common power drive is transmitted to the other components of the system. The vibratory action interferes with the operation of the other components and tends, for example, to upset the position of the books relative to the stitching heads and to displace the cover relative to the book, thereby interfering with proper registration. Consequently, defective books are produced in the course of operation. Moreover, it is not possible to run the trimmer independently of the combination, which may sometimes be desirable for special hand feeding operations.

In view of the foregoing, it is the principal object of this invention to provide a separate power drive for an automatic trimmer in a bookbinding system, whereby vibrations produced in the trimmer are isolated from the other components of the system. Another advantage of this arrangement is that the main drive motor in an existing gatherer, stitcher and coverer assembly need not be changed to accommodate the increased trimmer load.

Also an object of the invention is to provide, in a bookbinding system including an independent trimmer driving mechanism, apparatus for synchronizing the operation of the trimmer with the other components in the system.

More particularly it is an object of the invention to provide a variable speed motor drive unit for the trimmer mechanism and differential means to control the speed of the motor in response to a signal obtained from the gathering and binding machine assembly with reference to a signal indicative of trimmer speed to effect synchronous operation of all components in the system.

Still another object of the invention is to provide a bookbinding system including an independent trimmer drive mechanism which is efficient and reliable in operation.

Briefly stated, in a bookbinding system in accordance with the invention, a main motor is provided to power an assembly including a gatherer for the signatures and a stitcher to bind the assembled signatures, the bound books being fed to a trimmer mechanism which is driven by a separate variable speed motor unit. Means are provided to compare the speed of the assembly with that of the trimmer to produce a differential signal which is applied to the variable speed device in a manner effecting synchronous operation of the assembly and the trimmer.

For a better understanding of the invention as well as other objects and further features thereof, reference is made to the following detailed description to be read in conjunction with the accompanying drawings, wherein like components in the several views are identified by like reference numerals.

In the drawings:

Fig. 2 is a plan view of the variable speed motor unit and the differential mechanism for adjusting the speed thereof.

Fig. 3 is a front elevation showing the electric clutch for coupling the output of the variable speed device with the drive shaft for the trimmer.

Fig. 4 is a plan view showing the 90° turn conveyer feeding books into the hopper for delivery to the trimmer.

Fig. 5 is a sectional view taken along lines 5—5 in Fig. 4.

Fig. 6 is a side view of the hopper taken along the plane indicated by lines 6—6 in Fig. 5.

Fig. 7 is a sectional view of the trimmer device.

Figure 1:
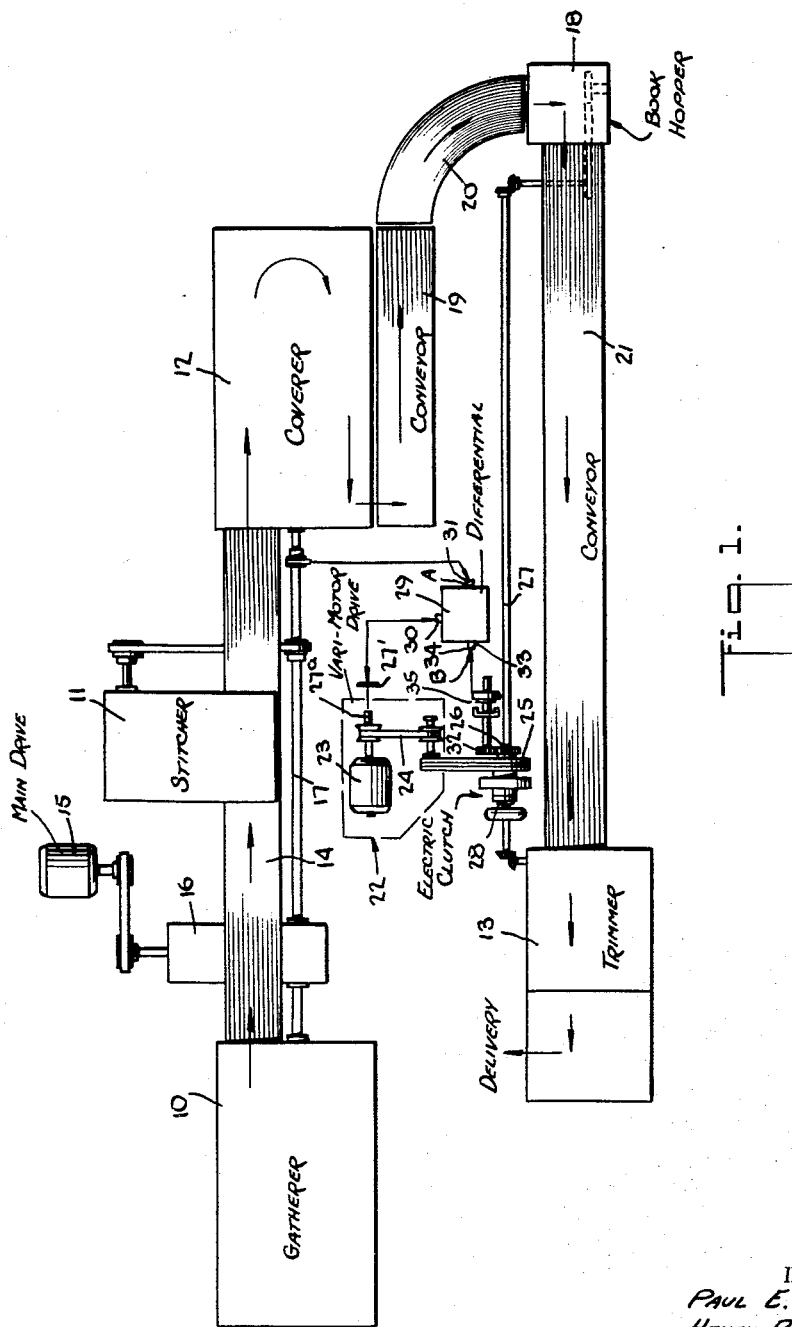
Fig. 1 is a schematic diagram of a system in accordance with the invention.

Referring now to Fig. 1, the main components of a bookbinding system in accordance with the invention are a gatherer machine 10, a stitcher 11, a covering device 12 and a trimmer 13, the operation of these components being so coordinated as to assemble, bind, cover and trim books on a continuous production basis. The arrows in Fig. 1 indicate the direction of book movement in the bookbinding system.

Gatherer 10 is of standard design and may, for example, be constituted by a mechanism acting to insert signatures on a continuously moving saddle, the signatures being opened and advanced by pins on a conveying chain or other conveyer means 14 to stitcher 11 which may be a saddle stitcher. A master book caliper is preferably located between the gatherer and the stitcher to detect missing or imperfect books and to trip the stitcher mechanism so that no stitches are made. The unstitched books may then be easily separated and rerun, thereby ensuring that only perfect books enter the delivery. The stitched books are fed by the conveyer 14 to the coverer 12 which is of any conventional design adapted to spread paste on the back of the stitched books and then to apply covers thereon.

The assembly constituted by the gatherer, the stitcher and the coverer 12 is powered by a main drive motor 15 of standard design which is coupled by an endless belt to a gear box 16 which turns a common drive shaft 17 for the three components.

The book trimmer 13 may be in the form of a single or two book automatic trimmer mechanism having either three, four or five knives, such as the Sheridan A–T Trimmer or the Sheridan B–T Trimmer manufactured by the T. W. & C. B. Sheridan Co. of New York. The books are conveyed from the coverer to a book hopper 18 which acts to deliver the books to the trimmer. Books are supplied to the hopper by means of a straight-line conveyer 19 whose output feeds onto a 90° power turn conveyer 20 on which the books are fed slowly and fanned out. The 90° power turn locates the trimmer and its infeed table parallel to the coverer, thereby reducing floor space requirements considerably.

The books are fed into the hopper singly and are then taken out of the bottom of the hopper and conveyed into the trimmer by the conveyer 21. The main function of the hopper is to act as a collecting box when it is desirable to trim two books at a time. Another function of the hopper is to act as a transfer between two conveyer mechanisms that may not be running at exactly the same relative position or phase at all times, even though their speeds may be alike. The relative position and phase may change due to varying acceleration of the motors, electric clutches, etc.

The trimmer 13 and the associated conveyers including the hopper 18 are powered by a separate motor drive unit, generally designated by numeral 22, which is independent of the main drive motor 15. The motor drive device 22 includes a constant speed motor 23, driving a variable pitch pulley 24 which in turn drives a V-belt pulley 25 and gear 26 free turning on a drive shaft 27 for the trimmer and hopper.

The variable speed motor drive unit 22 may be of the type manufactured by the Reeves Pulley Company, of Columbus, Indiana (Catalog No. M–558—April 16, 1956) utilizing the operating principle of a V-belt driving between two pairs of cone-shaped discs which are adjustable to form an infinite number of driving and driven diameters. The discs are mounted on parallel shafts, one shaft receiving power at constant speed from the motor, the other delivering power at infinitely adjustable speed to a gear reducer from which the desired speed is transmitted to the driven machine. The control in the speed is effected by means of a wheel 27' coupled to the speed-changing mechanism which may be in the form of a pitch adjusting screw 27a.

Shaft 27 is coupled to the V-belt pulley 25 from the output of the vari-motor drive unit 22 by means of an electric clutch 28. In order to synchronize the operation of the trimmer and hopper with that of the gatherer, stitcher and coverer assembly, a differential mechanism 29 is provided whose output shaft 30 is mechanically coupled into the control wheel 27' of the vari-motor drive 22. Fed into one input shaft 31 of the differential is a mechanical signal A taken from the drive shaft 17 of the gatherer, stitcher and coverer assembly at a definite number of turns per books. A mechanical signal B is also taken from the pulley 25 driving the trimmer and hopper, this being accomplished through a gear 32 coupled to the pulley gear 26 and keyed to a shaft 33 coupled through an electric clutch 35 to the second input 34 of the differential mechanism 29.

Thus the rotary speed and direction of the output shaft 30 depends on the speed relation of the input signals A and B and the extent of the difference therebetween. If signals A and B are equal, indicating synchronism between the assembly and trimmer speeds, there is no rotation of the output shaft 30, as a result of which the drive motor unit 22 for the trimmer will remain at its set speed. But if signal B either lags or leads signal A, there will be rotation in a direction and to an extent operating on the pitch adjusting screw of the unit to change the speed of the trimmer until it matches that of the assembly. When these speeds are the same, all rotation of the differential output shaft 30 will stop, causing no further change in the pitch diameter of the pulleys in the variable speed unit 22.

Referring now to Figs. 2 and 3, the physical arrangement of the vari-speed motor drive unit 22 is shown in conjunction with the differential mechanism 29. It will be seen that the V-belt pulley 25 and the gear 26 connected thereto ride freely on the drive shaft 27 for the hopper and trimmer. The electric clutch 28 which effects engagement between the pulley and gear combination 25 and 26 and shaft 27 includes a clutch coil 28a and a brake coil 28b. Gear 32 which engages gear 26 drives shaft 33 which applies the signal B to the differential shaft 34 through the electric clutch 35, shaft 34 being coupled to shaft 33 by means of a belt 36.

To apply signal B to the input shaft 31 of the differential mechanism, a shaft 37 is provided journaled at one end in a bearing 38 which also supports one end of the shaft 33, the shaft 37 being driven by the common shaft 17 of the gatherer, stitcher and binder assembly through a belt 39 (Fig. 2). Shaft 37 is coupled to input shaft 31 by a belt 40. Thus the rotary speed of shaft 33 represents the trimmer speed to provide signal B, whereas the rotary speed of shaft 37 represents the assembly speed to provide signal A. The resultant rotation of output shaft 30 on the differential mechanism 29 reflects the difference between signals A and B and acts to control the speed of the variable speed unit 22 accordingly to effect synchronous operation.

Referring now to Figs. 4 to 6, showing hopper 18, it will be seen that books conveyed on the 90° turn conveyer 20 are fed into the top of the hopper to form a book pile 41 therein. The hopper includes a low level switch 42 which will stop the trimmer when the level of the books in the hopper drops to a predetermined height. Low level switch signals the electric clutch 28 to decouple the motor drive unit from the trimmer shaft 27, thereby stopping the trimmer until books are again fed into the trimmer feed hopper. The trimmer will remain idle until books are again fed into the hopper to a level above the low level switch 42. The drop in the number of books in the hopper is normally due to a stoppage caused by the calipers in the gatherer.

Hopper 18 is provided with vertical side plates 43 and 44 and pusher fingers 45 which are reciprocated by a mechanism 46 to remove two or more books at a time from the bottom of the pile in the hopper.

Books ejected from hopper 18 pass under rollers 48 and 49 onto the continuous conveyer 21 for the trimmer which is provided with spaced pins 50 serving to push the books forward into the trimmer. Trimmer 13, as shown in Fig. 7, includes a first cutting stage provided with a reciprocating blade 51 acting against a fixed bottom blade 52 to trim the front edge. In the second stage the head and tail of the books are trimmed by a similar shear action, one reciprocating blade 53 being shown in the figure. Reciprocation of the blades is effected by a suitable eccentric mechanism 54 operated from the drive shaft 27 (Fig. 2.)

In operation, when the gather, stitcher and coverer assembly is running and the book feeding hopper is full, the trimmer drive motor unit 22 will run and the electric clutches 28 and 35 will be energized and engaged. Under such conditions the differential mechanism 29 will act continuously to maintain synchronism between the trimmer and hopper combination and the binding assembly.

If the covering machine in the assembly is running but fails to deliver books into the trimmer feed hopper, low level switch 42 will cause disengagement of clutch 28 until books are again fed into the hopper and attain the desired level therein. Even though the covering machine is not delivering books but still runs, the speed of the trimmer is constantly matched to that of the covering machine. Any speed change taking place in the covering machine is followed up by the trimmer motor, thereby maintaining the trimmer at its required speed at all times.

In the event the covering machine or binder is stopped by the operator, the electric clutches 28 and 35 are both disengaged. But the drive motor unit 22 for the trimmer still operates and since the covering machine 12 is stopped, the A signal shaft 37 is likewise halted. With the variable speed signal B shaft 33 still operating under the drive of the unit 22, it becomes necessary to disconnect this shaft from the differential 29, otherwise an extreme and continuous correction will be put on the variable pitch adjusting screw 27a by the differential output shaft 30.

This disconnection is effected by clutch 35. When the covering machine is restarted, clutch 35 is again energized and engaged, bringing the trimmer drive pulley 25 into step with the covering machine signal shaft 37. When books are again fed into the trimmer feed hopper 18 by the covering machine 12 and the books are at the operating level, clutch 28 is again energized and engaged, thereby operating the trimmer in time with the covering machine.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A bookbinding system comprising an assembly including a gatherer for signatures and a stitcher for binding the signatures to form books, an automatic trimmer for said books delivered thereto from said assembly, a main drive motor to power said assembly, a variable speed motor unit to power said trimmer, and apparatus to adjust the speed of said unit to run said trimmer in synchronism with said assembly, said apparatus including a differential mechanism having first and second input shafts and an output shaft, means coupling one of said input shafts to said trimmer drive unit, means coupling the other input shaft to said assembly whereby said output shaft rotation depends on the difference in the rotary speeds of the inputs, means coupling said output shaft to said unit to effect control thereof, means responsive when said assembly is rendered inoperative simultaneously to effect disengagement of said one input shaft of the differential from said drive unit, clutch means to effect engagement between said trimmer and said motor unit powering same, a hopper for feeding books into said trimmer and provided with a low level switch, and means to disengage said clutch means when said low level switch is actuated.

2. A bookbinding machine including the combination of means for forming signatures into a traveling succession of untrimmed books, means for receiving said traveling succession of books and trimming the latter, means located between the first and second named means for intercepting said traveling succession of books by forming said books into a stack and delivering a traveling succession of books from said stack, and means responsive to the height of said stack for automatically stopping said delivering by the third named means when said height reduces a predetermined amount and for automatically starting said delivering when said height increases a predetermined amount.

3. A bookbinding machine including the combination of means for forming signatures into a traveling succession of untrimmed books, means for receiving said traveling succession of books and trimming the latter, means located between the first and second named means for intercepting said traveling succession of books by forming said books into a stack and delivering a traveling succession of books from said stack, and means responsive to the height of said stack for automatically stopping said delivering by the third named means when said height reduces a predetermined amount and for automatically starting said delivering when said height increases a predetermined amount, the fourth named means automatically stopping and starting the second named means simultaneously with said stopping and starting of the third named means.

References Cited in the file of this patent

UNITED STATES PATENTS

| | | |
|---|---|---|
| 2,062,136 | Manesford | Nov. 24, 1936 |
| 2,239,632 | Tenn | Apr. 22, 1941 |
| 2,243,655 | Scott | May 27, 1941 |
| 2,256,569 | Kennedy | Sept. 23, 1941 |
| 2,609,779 | Goldsworthy | Sept. 9, 1952 |